(No Model.) 4 Sheets—Sheet 4.

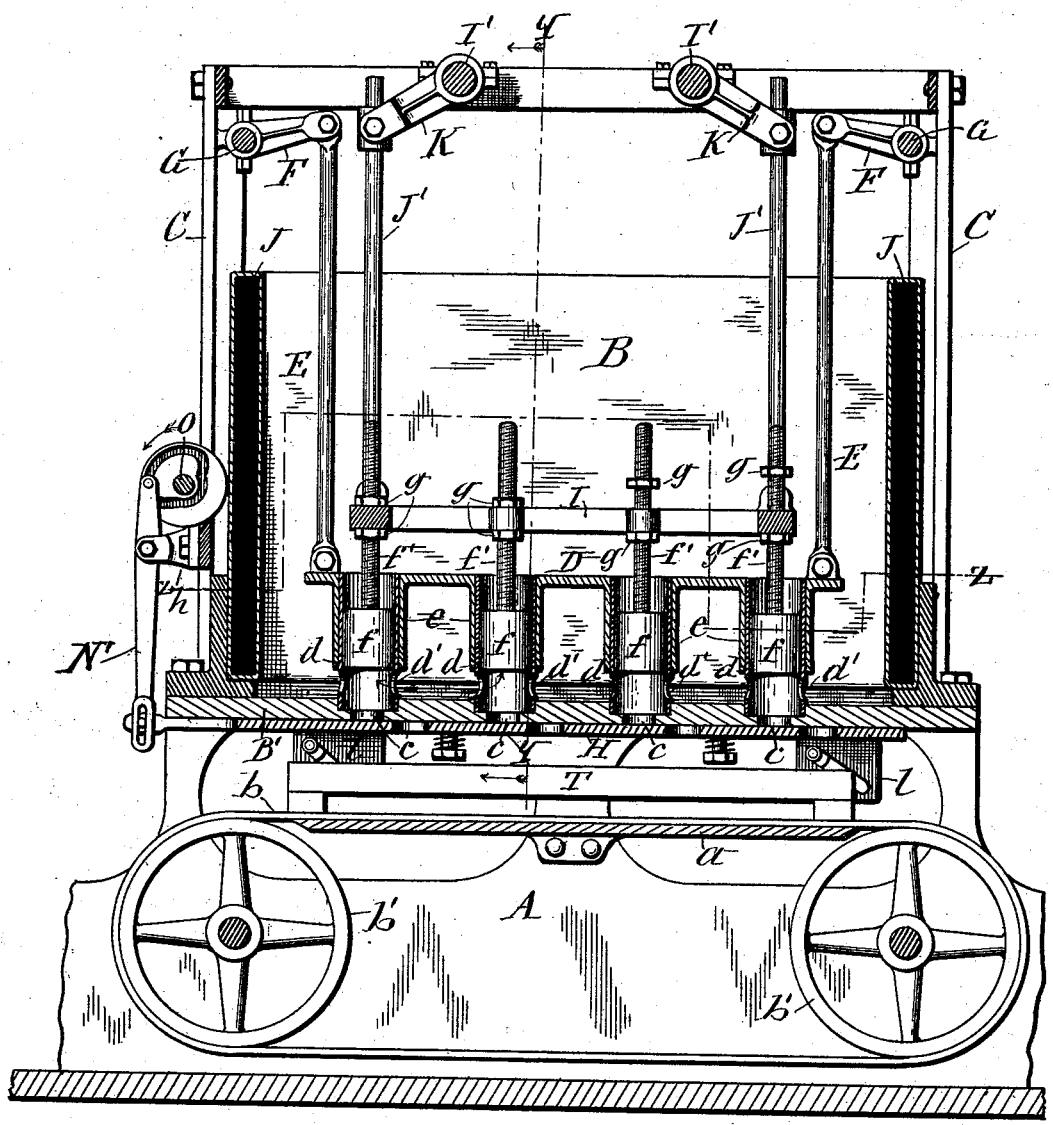

J. C. WALIER.
MACHINE FOR MOLDING CONFECTIONS.

No. 524,097. Patented Aug. 7, 1894.

WITNESSES: INVENTOR:
Joseph C. Walier
By E. Laass
Attorney

UNITED STATES PATENT OFFICE.

JOSEPH C. WALIER, OF SYRACUSE, NEW YORK.

MACHINE FOR MOLDING CONFECTIONS.

SPECIFICATION forming part of Letters Patent No. 524,097, dated August 7, 1894.

Application filed April 21, 1894. Serial No. 508,482. (No model.)

*To all whom it may concern:*

Be it known that I, JOSEPH C. WALIER, of Syracuse, in the county of Onondaga, in the State of New York, have invented new and useful Improvements in Machines for Molding Confections, of which the following, taken in connection with the accompanying drawings, is a full, clear, and exact description.

This invention relates to the class of machines which are provided with a hopper for containing the material from which the confection-drops are to be formed. Said hopper being provided in its bottom with discharge spouts through which the aforesaid material is forced by plungers to the molds placed under the hopper.

The invention consists in an improved construction and combination of parts constituting a confection molding machine of great efficiency in its operation and which is adjustable to mold confections of different sizes as may be desired, all as hereinafter more fully described and specifically set forth in the claims.

The invention is fully illustrated in the annexed drawings, in which—

Figure 1:
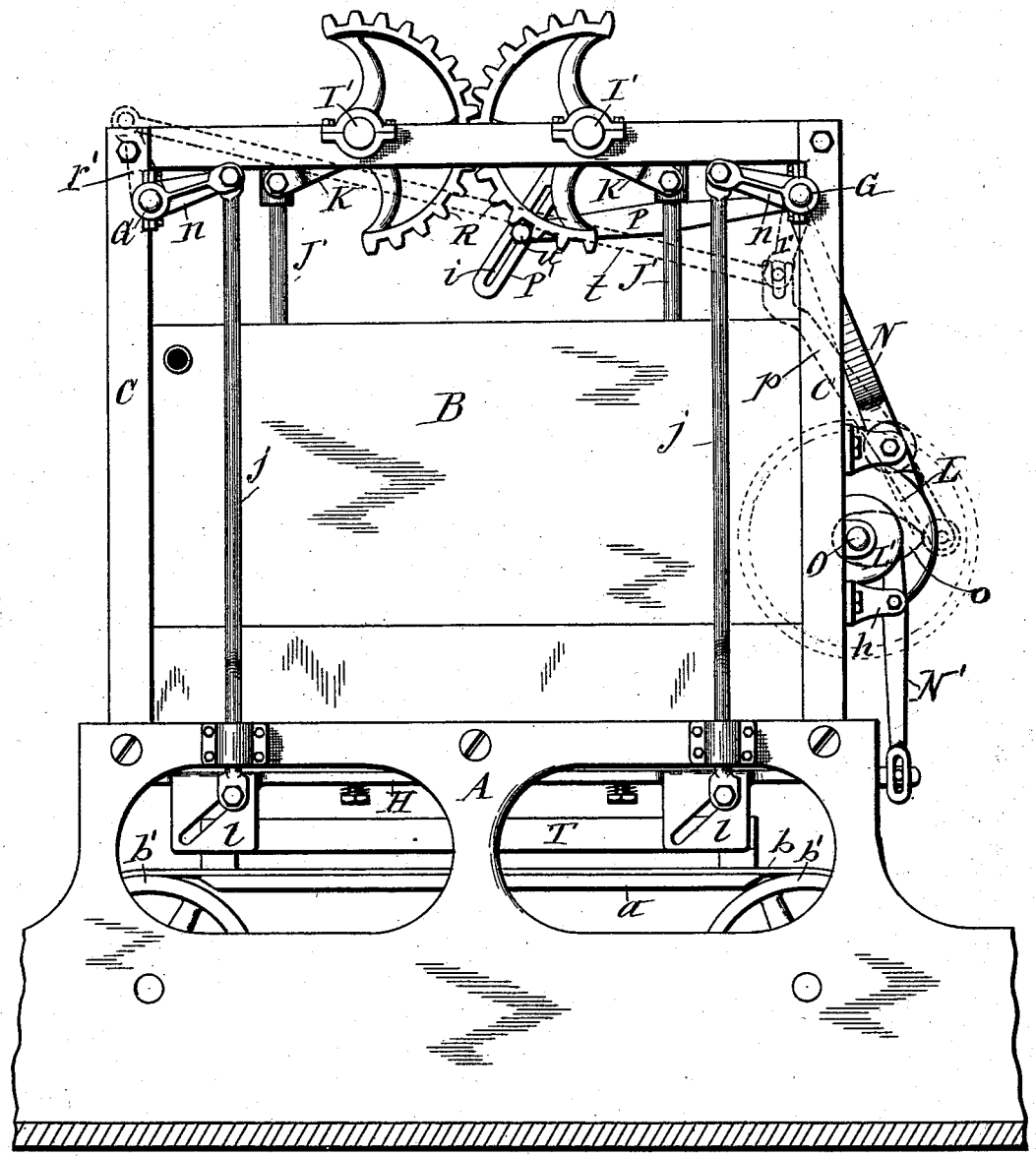
Figure 2:
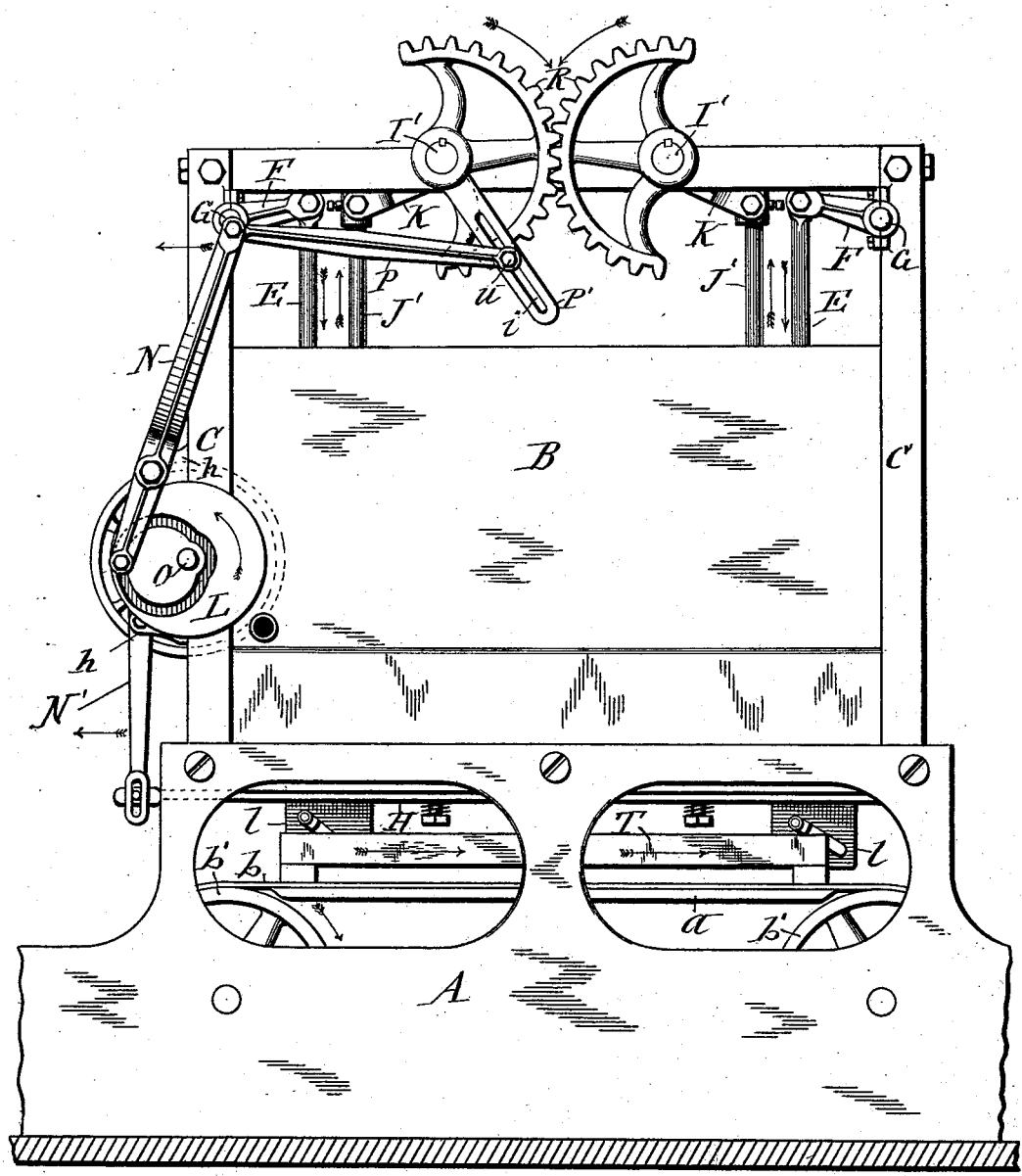
Figure 5:
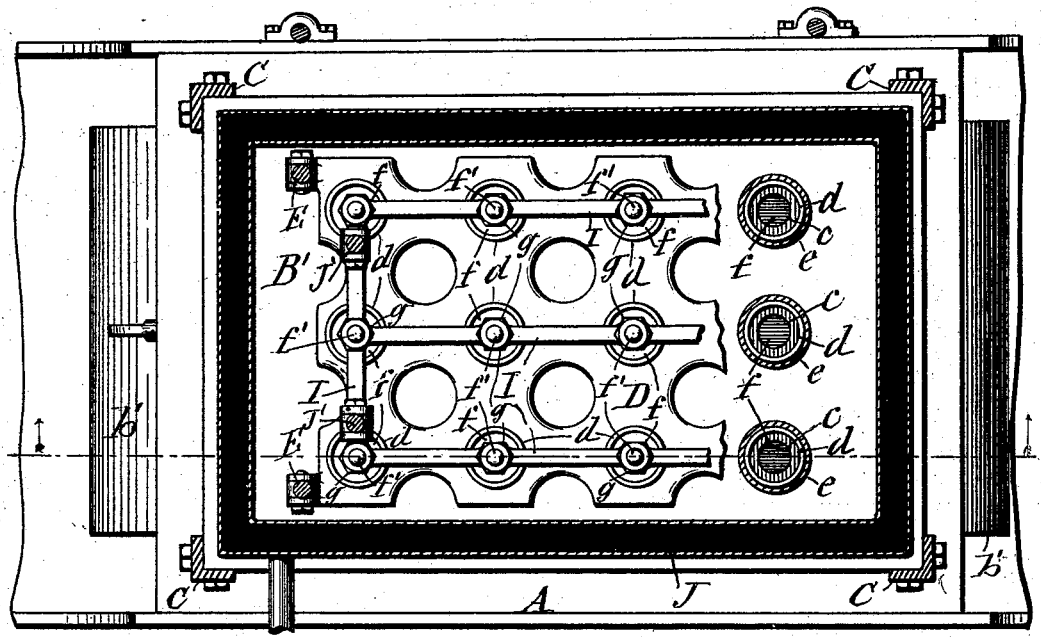
Figure 4:
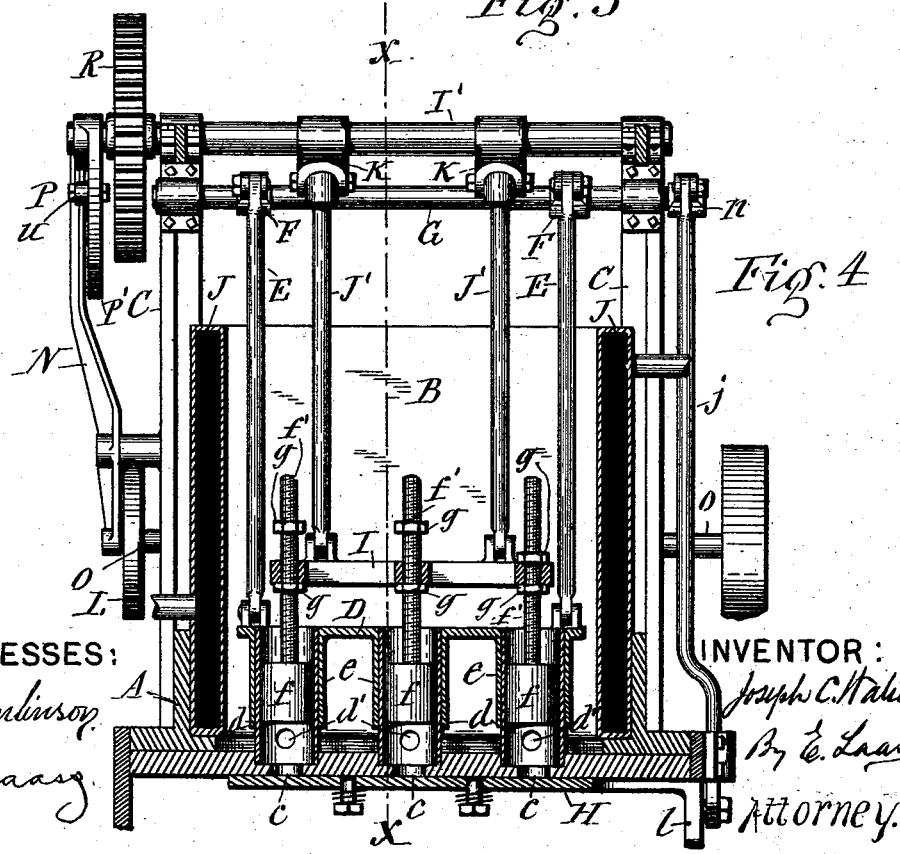

Figures 1 and 2 are elevations of opposite sides of a confection molding machine embodying my invention. Fig. 3 is a vertical longitudinal section on line —X—X— in Fig. 4. Fig. 4 is a vertical transverse section on line —y—y— in Fig. 3 and Fig. 5 is a horizontal transverse section on line —Z—Z— in Fig. 3.

Similar letters of reference indicate corresponding parts.

—A— represents the base of the machine, said base consisting of two stout parallel walls of cast iron or other suitable material. On the inner sides of these walls are horizontal guides —a—a— for supporting the trays —T— which contain the molds in which the confection is to be deposited. For conveying the trays to and from under the machine, I prefer to employ an endless belt —b— carried on pulleys —b'—.

Upon the base —A— is mounted the hopper —B— and frame —C— which latter extends above the hopper for the purpose hereinafter explained. The hopper is formed of hollow metallic walls forming a jacket —J— which is charged either with steam or hot water or hot air to heat the contents of the hopper and maintain the same in proper condition for being molded. The bottom —B'— of the hopper is provided with discharge-openings —c—c— and from these openings extend upward, the gage-tubes —d—d— which are firmly secured to the said bottom and are provided with ports —d'—d'— in their sides. Over the said tubes slide telescopically the tubular valves —e— which are fastened at their upper ends to a horizontal plate —D— and receive intermittent reciprocating motion by means of pitmen —E—E— connecting the plate —D— to arms —F—F— extending from rock-shafts —G—G— over opposite ends of the hopper. Said rock-shaft being operated automatically with other actuating mechanisms of the machine as hereinafter described. On the bottom of the hopper is the longitudinally movable gate —H— for opening and closing at the proper times the discharge openings —c—c—. Said gate being also operated automatically as hereinafter described.

In the gage-tubes —d—d— are plungers —f— which are connected to a horizontal skeleton frame —I— and receive reciprocating motion from rock-shafts —I'—I'— from which extend arms —K—K— which are connected with the frame —I— by pitmen —J'—.

In order to permit the machine to be adjusted for forming confection drops of different sizes, I connect the plungers to the frame —I— adjustably so as to vary the lengths of the strokes of said plungers. For this purpose I prefer to connect the plungers to the frame by means of screw-threaded stems —f'— which pass through eyes in the frame —I— and are provided with nuts —g— g— above and below said frame. By loosening one or both nuts on the stem so as to produce a lost vertical motion between the stem and frame, the stroke of the plunger connected to said stem is reduced and the quantity of material forced through discharge opening —c— is correspondingly diminished.

In the operation of the machine, the gate —H— is closed and the valves —e—e— raised to open the ports —d'—d'—. Then the plungers —f—f— are raised and this causes the confection-material to be sucked through the aforesaid ports into the gage-tubes —d—

*d*—. Then the valves —*e*—*e*— are closed to retain the material in the bottom portion of the tubes. Then the gate —H— is opened and the plungers —*f*—*f*— pressed down to force the material from the tubes —*d*—*d*— down into the molds contained in the trays —T—. The aforesaid operation is repeated in the same order until the hopper is exhausted of its contents.

The gate —H—, valves —*e*—*e* and plungers —*f*—*f*— are operated automatically in the order before stated by suitable mechanisms receiving motion in common from the main driving shaft —O— of the machine. Said mechanism for transmitting the different motions may be varied without departing from the spirit of my invention.

The annexed drawings illustrate an exemplification of suitable mechanisms for the aforesaid purpose in which —L— and —L'— denote cam-wheels attached to the driving shaft —O—.

To the frame —C— are fastened two brackets —*h*—*h*— to one of which is pivoted a lever —N— which has its upper end connected by a pitman —P— to an arm —P'— on one of the rock-shafts —I'— which actuate the plungers —*f*—*f*—, by means of the frame —I—. The opposite end of said lever engages the cam —L— whereby it receives an oscillatory motion which is transmitted to the rock-shaft —I'— by the pitman —P—. Intermeshing gears —R—R— of equal sizes are attached to the two rock-shafts —I'—I'— to cause them to operate in unison. In order to allow the motion of said rock-shafts to be adjusted to impart longer or shorter strokes to the frame —I— which carries the plungers, I slot the arm —P'— longitudinally as shown at —*i*— in Figs. 1 and 2 of the drawings, for the reception of the coupling pin, *u*. To the other bracket —*h*— hereinbefore referred to, is pivoted a lever —N'— one end of which engages a cam —L'— attached to the driving shaft —O—, by which it receives an oscillatory motion. The opposite or lower end of said lever is connected to the gate —H— to move the same so as to open and close the discharge openings —*c*—*c*— of the hopper —B—.

In order to cause the valves —*e*—*e*— to open the ports —*d'*—*d'*— either simultaneously with or immediately after the closing of the discharge openings —*c*—*c*—, I employ suitable mechanisms driven primarily by the main driving shaft —O— and transmitting intermittent motion to the rock-shafts —G—G—. One simple form of said mechanism is shown by full lines in the drawings and consists of cam-plates —*l*—*l*— attached to the gate —H— and during the movement of said gate imparting reciprocating motion to pitmen —*j*—*j*— engaging said cam-plates and connected to arms —*n*—*n*— attached to the rock-shafts —G—G—. Another form of said mechanism is indicated by dotted lines in Fig. 1 of the drawings, and consists of a cam —*o*— mounted on the driving shaft —O— and engaging the lower end of a lever —*p*— fulcrumed on the frame —C—, the upper end of which lever is connected to an arm —*r*— on one of the rock-shafts —G— and a rod —*t*— connects said arm to an arm —*r'*— which is fastened to the other rock-shaft —G—.

It is obvious that the means for transmitting motion from the driving shaft —O— to the gate —H—, valves —*e*—*e*— and plungers —*f*—*f*— is susceptible of numerous variations and I therefore do not limit myself to the specific mechanisms herein shown and described.

The operation of the described machine is as follows: The confection-material is deposited in the hopper —B— while the gate —H— is closed and the valves —*e*—*e*— raised to open the ports —*d'*—*d'*—. Then the machine is set in motion, which causes the plungers —*f*—*f*— to be raised and thereby produce a suction in the tubes —*d*—*d*— which draws the confection-material into said tubes. Then the valves —*e*— descend and close the ports —*d'*—*d'*— and immediately thereafter the gate —H— opens the discharge openings —*c*—*c*— and the plungers —*f*—*f*— descend and force the material out of the tubes from whence said material drops into molds contained in the trays —T—. This operation is repeated in the same order and while the gate —H— is closed, another tray containing empty molds is placed under the hopper —B— to receive the next discharges of confection-material.

What I claim as my invention is—

1. In combination with the hopper provided with discharge openings in its bottom, tubes extending upward from said openings and provided with ports in their sides, valves opening and closing said ports, plungers in said tubes, and a gate movable across the discharge openings as set forth.

2. In combination with the hopper provided with discharge openings in its bottom, tubes extending upward from said openings and provided with ports in their sides, valves sliding telescopically on said tubes, a plate uniting said valves, plungers in the tubes, a vertically movable horizontal frame carrying said plungers, and a gate movable across the discharge openings as set forth.

3. In combination with the hopper provided with discharge openings in its bottom and a gate movable across said openings, vertical tubes over the openings provided with ports in their sides, valves sliding telescopically over said tubes, a plate uniting said valves, a vertically movable horizontal frame above the tubes, and plungers in the tubes connected vertically adjustable to said frame as set forth.

4. In combination with the hopper provided with discharge openings in its bottom and a gate movable across said openings, vertical tubes communicating with the openings and provided with ports in their sides, valves sliding telescopically over the tubes, a vertically movable frame above the tubes and provided with vertical eyes, plungers having screw-threaded stems passing through said eyes and nuts on said stems above and below the frame to carry the plungers different distances during the movement of the aforesaid frame as set forth.

5. In combination with the hopper provided with discharge openings in its bottom, a gate movable across said openings, tubes extending upward from the openings and provided with ports in their sides, valves sliding telescopically over the tubes, a vertically movable horizontal frame above the tubes, plungers carried on said frame, rock-shafts above said frame, arms extending from said rock-shafts, and pitmen connecting said arms to the aforesaid frame as set forth.

6. In combination with the hopper provided with discharge openings in its bottom, tubes extending upward from said openings and provided with ports in their sides, valves sliding telescopically on said tubes, a plate uniting said valves, two sets of rock-shafts over the hopper, arms extending from one set of said shafts, pitmen connecting said arms to said plate, plungers in the tubes, a frame carrying said plungers, arms on the other set of rock-shafts, and pitmen connecting the latter arms to the plunger-carrying frame as set forth.

7. In combination with the hopper and plungers, a vertically movable frame carrying said plungers, rock-shafts above the hopper, arms extending from the rock-shafts, pitmen connecting said arms to the vertically movable plate and intermeshing gears attached to the rock-shafts to operate the same in unison as set forth.

8. In combination with the hopper, driving shaft and plungers, a vertically movable frame carrying said plungers, rock-shafts above the hopper, arms extending from said shafts, pitmen connecting said arms to the aforesaid frame, an arm extended from one of the rock-shafts and slotted longitudinally, a cam on the driving shaft, a lever actuated by said cam, a pitman connecting said lever adjustably to the slotted arm, and intermeshing gears on the rock-shafts operating the same in the manner as set forth.

9. In combination with the main frame, hopper, and gate under the hopper, vertical tubes provided with ports, and vertically movable valves and plungers in the hopper, a plate uniting said valves, a frame carrying the plungers, a main driving shaft, and mechanisms transmitting motion from said shaft successively to the gate, valves and plungers as set forth.

In testimony whereof I have hereunto signed my name this 18th day of April, 1894.

JOSEPH C. WALIER. [L. S.]

Witnesses:
JOHN J. LAASS,
CHARLES E. TOMLINSON.